United States Patent [19]

Foley

[11] 4,277,406
[45] Jul. 7, 1981

[54] NOVEL TRIARYLMETHANE COMPOUNDS

[75] Inventor: James W. Foley, Andover, Mass.

[73] Assignee: Polaroid Corporation, Cambridge, Mass.

[21] Appl. No.: 106,899

[22] Filed: Dec. 26, 1979

[51] Int. Cl.³ ............................................. C09B 11/10
[52] U.S. Cl. .................................... 260/389; 260/386; 260/390; 260/395; 260/338; 260/388; 544/3; 544/162; 544/170; 544/171; 544/229; 544/237; 544/239; 544/192
[58] Field of Search ............... 260/389, 386, 395, 390, 260/338; 544/3, 162, 170, 171, 229, 237, 239, 192

[56] References Cited

U.S. PATENT DOCUMENTS

| | | | |
|---|---|---|---|
| 2,673,862 | 3/1954 | Krimmel | 260/389 |
| 2,678,321 | 5/1954 | Krimmel | 260/389 |
| 3,086,979 | 4/1963 | Krimmel | 260/389 |
| 3,406,069 | 10/1968 | Overman | 96/74 |

Primary Examiner—Paul F. Shaver
Attorney, Agent, or Firm—Sybil A. Campbell

[57] ABSTRACT

The present invention is concerned with novel triarylmethane dyes possessing in their triaryl structure a 4'-oxo-1'-naphthylidene (or a 4'-oxo-1'-phenylidene) moiety and a phenyl moiety substituted in the ortho-position to the central carbon atom with the group

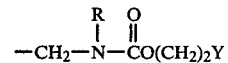

wherein R is alkyl, unsubstituted or substituted with a solubilizing group, and Y is an electron-withdrawing group, which compounds find utility in photographic products and processes.

9 Claims, No Drawings

NOVEL TRIARYLMETHANE COMPOUNDS

BACKGROUND OF THE INVENTION

1. Field of the Invention

This invention relates to novel chemical compounds, and more particularly, it relates to novel triarylmethane compounds which are useful, e.g., as light-screening dyes in photographic products and processes.

2. Description of the Prior Art

It is well known that photographic film, and especially multicolor films, may and generally do vary from lot to lot, notwithstanding efforts to "repeat" previous films. Manufacturers of multicolor photographic films have developed a number of procedures to minimize the effects upon the final multicolor image of unavoidable variations in the manufacturing operations. These variations are reflected primarily in shifts in color balance as reflected in mismatching of the D log E curves of the individual red, green and blue exposures. Equipment used to coat multicolor films is highly precise but variations between intended coverage of silver halide and/or the dye image-forming materials do occur. Repeat batches of silver halide emulsions may, and usually do, vary in their photographic response. Individual layers may be dried to slightly different degrees. Films are stored for a period of time after coating to allow the films to "age", so that changes in sensitometry following coating have an opportunity to reach a plateau prior to sale. If the film is designed to be developed by a photofinisher or in a darkroom, processing of the exposed multicolor film is controlled within very narrow limits, typically within plus or minus a half degree of a prescribed temperature, in order to minimize sensitometric variations from film to film. Where the multicolor film is of the negative type, an opportunity to adjust the sensitometry occurs in printing the desired final positive image, during which operation the printing exposure may be appropriately color filtered.

The basic sources of sensitometric variations noted above exist also in multicolor diffusion transfer films, with the added complication that once the film is shipped, the sensitometric properties are essentially fixed. The opportunity for adjustment provided in darkroom processing, practically speaking, is unavailable for users of self-developing films. While professional and advanced amateur photographers may be skillful enough to utilize color correction filters to at least partially "rebalance" the color balance, ordinary users of the film would only be confused by such additional operations.

It is well known to use light-screening dyes in photographic elements. Such a dye may be incorporated as a filter dye in a light-sensitive emulsion layer(s) or in a layer coated over one or more light-sensitive emulsion layers or between two differently color-sensitized emulsion layers to modify the light record in the emulsion layer or to control the spectral composition of light falling on the underlying light-sensitive layer, or it may be incorporated as an antihalation dye in a non-light-sensitive layer positioned on either side of a support carrying the light-sensitive layer(s).

The dyes employed for these purposes, in addition to having the requisite spectral absorption characteristics for their intended use, should not have any adverse effect on the properties of the light-sensitive emulsion layer(s), and also, should be capable of being decolorized or removed during photographic processing so as not to leave stain in the processed photographic element. In photographic processes where the dye is removed by being dissolved in a processing solution, it is usually preferred that the dye also decolorize in order to avoid contamination of the processing solution and to prevent staining from residual dye in the processed light-sensitive element.

Though various classes of dyes have been proposed for use in antihalation and color correction filter layers, the dyes heretofore employed have not been altogether satisfactory. Some of the dyes tend to reduce sensitivity, fog or exert other adverse effect on the light-sensitive material. However, the major drawback of previously employed dyes is their tendency to cause stain due to incomplete decolorization or reversal of some of the decolorized form to the original colored form. For example, some classes of dyes rely on the presence of a reagent, such as, a sulfite for "bleaching", i.e., decolorization and unless the dyes are removed from the light-sensitive material during or after processing, their color may reappear in time.

Among the classes of light-screening dyes used previously are the triarylmethanes. For example, U.S. Pat. Nos. 1,879,537; 1,994,876; 2,350,090 and 3,005,711 disclose the use of fuchsone-type dyes in antihalation layers, and U.S. Pat. Nos. 3,406,069 and 3,615,548 are concerned with the metal chelates of fuchsone dyes as antihalation dyes. These and other types of triarylmethane dyes suffer from one or more of the drawbacks discussed above, and in particular, prior dyes of this type have been difficult to keep decolorized at the pH's normally encountered during processing subsequent to "bleaching" and in the final product.

The present invention is concerned with a class of triarylmethane dyes which find utility as photographic light-screening dyes that are free from the deficiencies associated with the dyes previously used for this purpose. The subject triarylmethane dyes, which will be defined with greater particularity hereinafter, are efficient absorbers or radiation within a predetermined range in the visible range of 400 to 700 nm, may be incorporated in gelatin or other processing composition-permeable colloidal binding agents and are decolorized at an alkaline pH to yield a colorless product. Because of their ability to decolorize completely and irreversibly in base without requiring an additional reagent, such as, a sulfite for the "bleaching" reaction and because the new colorless product produced upon irreversible cleavage remains colorless in aqueous solution over a pH range of 1 to 14, the cleavage product may be retained in the photographic light-sensitive element without the possibility of color reappearing in time. Besides being non-staining, the compounds usually are substantially inert with respect to the light-sensitive material and thus, may be positioned in a layer adjacent to a silver halide emulsion layer or directly incorporated into an emulsion layer without having any adverse effect on the properties of the emulsion.

SUMMARY OF THE INVENTION

It is therefore the primary object of the present invention to provide novel triarylmethane compounds.

It is another object of the present invention to provide triarylmethane compounds useful as light-screening dyes in photographic products and processes.

Other objects of this invention will in part be obvious and will in part appear hereinafter.

This invention accordingly comprises the products and compositions possessing the features, properties and the relation of elements which are exemplified in the following detailed disclosure, and the scope of the application of which will be indicated in the claims.

According to the present invention, novel triarylmethane compounds are provided which possess in their triaryl structure a 4'-oxo-1'-naphthylidene (or a 4'-oxo-1'-phenylidene) moiety and a phenyl moiety substituted in the position ortho to the central carbon atom with the group

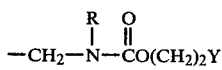

wherein R is an alkyl group, unsubstituted or substituted with a solubilizing group, and Y is an electron-withdrawing group.

For a fuller understanding of the nature and objects of the present invention, reference should be had to the following detailed description.

DETAILED DESCRIPTION OF THE INVENTION

The novel compounds provided by the present invention may be represented by the formula

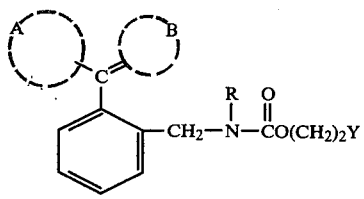

wherein A is a phenyl moiety or a naphthyl moiety; B is a 4'-oxo-1'-phenylidene moiety or a 4'-oxo-1'-naphthylidene moiety; R is alkyl, unsubstituted or substituted with a solubilizing group, and Y is an electron-withdrawing group. By "electron-withdrawing group" is meant a group having a positive sigma value as defined by Hammett's Equation.

As noted above, the subject compounds are initially colored, i.e., capable of absorbing visible radiation, and at an alkaline pH, are converted to a colorless product by undergoing an irreversible cleavage reaction with base. The colorless product formed is a new compound which is different from and non-reversible to the colored compound by a change in pH. In particular, it is the

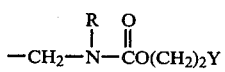

group substituted on the phenyl moiety in a position ortho to the central carbon atom that undergoes the irreversible cleavage reaction in alkaline solution that is complete within a predetermined time at a predetermined alkaline pH to give the new colorless compound, namely, the cyclic amine, as illustrated by the following wherein the A moiety is 4'-hydroxyphenyl and the B moiety is 4'-oxo-phenylidene.

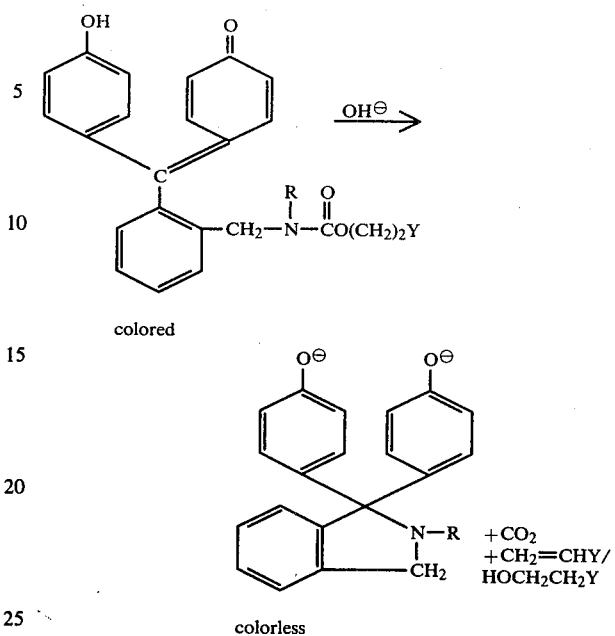

It will be appreciated that the by-products formed upon cleavage of the group also are colorless. Because the said cleavage reaction proceeds at a faster rate at higher pH's, the subject compounds are particularly suitable for use in photographic processes where the pH is maintained above about 10 at least for the time necessary for decolorization to the corresponding cyclic amine.

It will be understood that the A moiety and/or the B moiety of the compounds represented in formula I above may contain one or more substituents in addition to those specified, which substituents should not interfere with the intended use of the compounds.

Typical substituents include branched or straight chain alkyl, such as, methyl, ethyl, isopropyl, n-butyl, n-propyl, t-butyl, hexyl, octyl, dodecyl, hexadecyl, octadecyl and eicosanyl; aryl, such as phenyl and naphthyl; alkaryl and aralkyl, preferably, alkyl-substituted phenyl and phenyl-substituted alkyl, such as p-ethylphenyl, p-octylphenyl, p-dodecylphenyl, benzyl, phenethyl, phenylhexyl and phenyldodecyl; alkoxy, such as, methoxy, ethoxy, butoxy, octadecyloxy, 1-ethoxy-2-(β-ethoxyethoxy); aryloxy, such as, phenoxy, benzyloxy and naphthoxy; alkoxyalkyl, such as, methoxymethyl, ethoxymethyl, and dodecyloxyethyl; halo, such as, fluoro, bromo and chloro; trihalomethyl, such as, trifluoromethyl and trichloromethyl; sulfonamido (—NH—SO$_2$R° wherein R° is alkyl, aryl, alkaryl or aralkyl); sulfamoyl (—SO$_2$—NH—R° wherein R° has the same meaning given above); sulfonyl (—SO$_2$R° wherein R° has the same meaning given above); sulfo; hydroxy; amino including mono- and disubstituted amino (—NR'R" wherein R' and R" each are hydrogen, alkyl, aryl, alkaryl or aralkyl and R' and R" taken together represent the atoms necessary to complete a heterocyclic ring, such as piperidino, pyrrolidino, N-lower alkyl-piperazino, morpholino, thiomorpholino and tetrahydro-2H,4H-1,3,6-dioxazocino.

Typical of the triarylmethane compounds of the present invention are those represented by the following formula

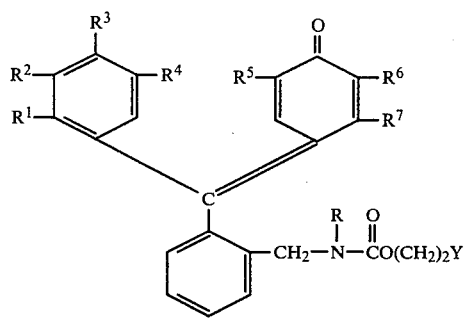

(II)

wherein $R^1$ is hydrogen, alkyl, alkoxy or hydroxy, $R^2$ and $R^4$ each are selected from hydrogen, alkyl, alkoxy, chloro and fluoro; $R^1$ and $R^2$ taken together represent the carbon atoms necessary to complete a fused benzene ring; $R^3$ is hydrogen, alkyl, alkoxy, hydroxy, —N,N-(dialkyl)amino, —N,N—(w—$R^8$alkyl)$_2$amino wherein $R^8$ is halo or hydroxy, piperidino, pyrrolidino, N-methylpiperazino, morpholino, thiomorpholino or tetrahydro-2H,4H-1,3,6-dioxazocino; $R^5$ is hydrogen, phenyl, alkyl, alkoxy, chloro or fluoro; $R^6$ is hydrogen, alkyl, alkoxy, chloro or fluoro; $R^7$ is hydrogen, alkyl, alkoxy or hydroxy and $R^6$ and $R^7$ taken together represent the carbon atoms necessary to complete a fused benzene ring; and R and Y have the same meaning given in formula I above.

Usually, the alkyl and alkoxy substituents comprising $R^1$, $R^2$, $R^3$, $R^4$, $R^5$, $R^6$ and $R^7$ are lower alkyl having 1 to 4 carbon atoms, such as, methyl, ethyl, n-propyl, isopropyl and n-butyl and lower alkoxy having 1 to 4 carbon atoms, such as, methoxy, ethoxy, propoxy and butoxy. Also, the alkyl groups of the —N,N—(dialkyl)amino and —N,N—(w—$R^8$alkyl)$_2$amino substituents usually are lower alkyl having 1 to 4 carbon atoms and $R^8$, when halo, is preferably chloro. Usually, $R^3$ is hydroxy or —N,N—(dialkyl)amino.

By "solubilizing group" is meant a group that enhances the solubility of the compound in aqueous alkaline photographic processing solution. Preferably, said solubilizing groups are —SO$_3$H, —COOH or —OH and said R is an alkyl group having 1 to 4 carbon atoms.

The electron-withdrawing group, Y, preferably has a positive sigma value ($\sigma^-$) greater than 0.6. Preferred electron-withdrawing groups include nitro; cyano; —SO$_2$CH$_3$;

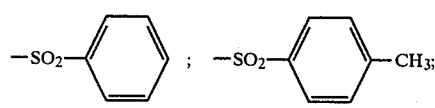

and —SO$_2$N(CH$_2$Ph)$_2$. The sigma value for these and other groups, such as —CHO, —COOH, —COOC$_2$H$_5$ and —CONH$_2$ have been reported by Eugen Müller, Methoden Der Organischen Chemie, Georg Thieme Verlag, Stuttgart, 1970, p. 78 in terms of $\sigma^-$ values based on the ionization of p-substituted phenols.

Specific examples of compounds within the scope of the present invention are as follows:

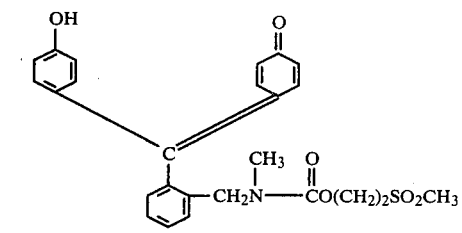

(1)

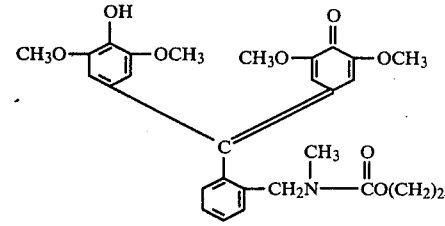

(2)

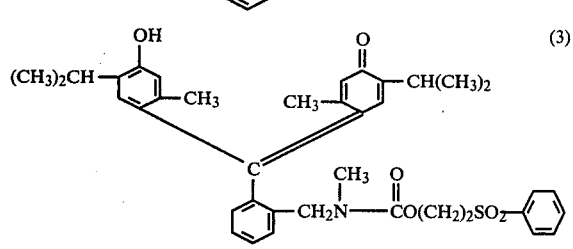

(3)

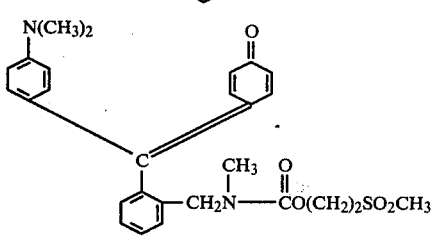

(4)

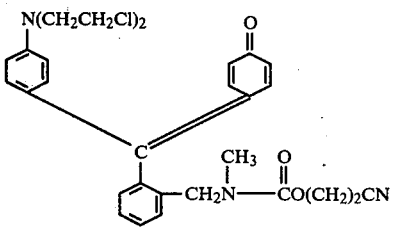

(5)

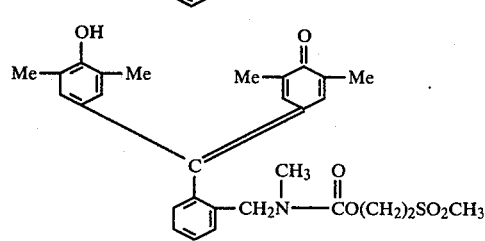

(6)

The compounds of the present invention may be prepared by reacting the selected 3,3-disubstituted phthalide (phthalein) with RNH$_2$ to give the corresponding phthalimidine followed by reduction with diborane in tetrahydrofuran solution to the corresponding iso-indoline which is reacted with the appropriate chloroformate to yield the triarylmethane dye product. This synthesis is illustrated below employing phenolphthalein as the phthalide starting material.

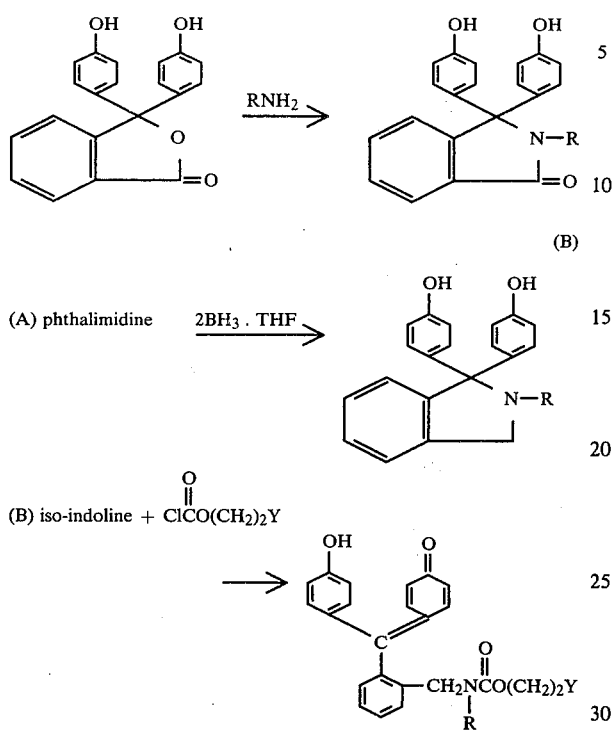

R and Y have the same meaning given in formula I.

Phthalimidines (A) wherein R, for example, is methyl, butyl, octyl, dodecyl, phenyl, cyclohexyl, β-hydroxyethyl or γ-hydroxypropyl are disclosed in French Patent No. 1,519,027 (C.A. 71:12999m, 1969).

The chloroformates may be prepared by reacting the selected HO(CH$_2$)$_2$Y with phosgene to give the corresponding

ClCO(CH$_2$)$_2$Y.

The 3,3-disubstituted phthalides used as the starting materials in the above synthesis may be prepared using various methods known in the art. In one of the more conventional procedures, phenols, such as, thymol, o-cresol and phenol itself are reacted with phthalic anhydride at elevated temperatures in the presence of a suitable catalyst such as zinc chloride or sulfuric acid to yield the corresponding symmetrical 3,3-disubstituted phthalide, i.e., wherein the 3,3 substituents are the same. Another method of synthesizing 3,3-disubstituted phthalides wherein the 3,3 substituents may be the same or different is disclosed and claimed in U.S. Pat. No. 3,931,228 to Alan L. Borror. In the latter method, a phenol or a 1-naphthol is reacted with phthalaldehydic acid to give the corresponding p-phthalidylphenol or p-phthalidylnaphthol adduct which is oxidized by dehydrogenation to selectively remove the hydrogen from the 3-position of the phthalidyl portion of the adduct and to remove the hydrogen from the phenolic or naphtholic hydroxy group. This oxidized intermediate is then condensed with a phenol, a 1-naphthol, etc., preferably in the presence of an acid catalyst, to yield the corresponding 3,3-disubstituted phthalide.

The following example is given to further illustrate the present invention and is not intended to limit the scope thereof.

EXAMPLE

Preparation of the compound having the formula

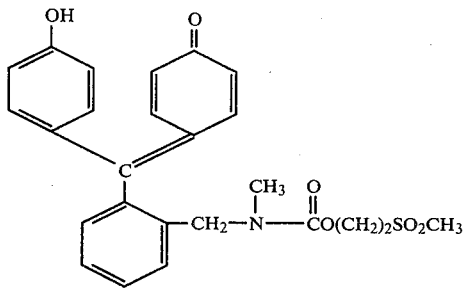

(a) Phenolphthalein (100 g) was stirred at room temperature with 500 g of 40% methylamine solution for 5 days. (After stirring for 48 hours, the pink color had disappeared and a white flocculant solid had precipitated.) The white solid was filtered, air-dried and crystallized from isopropanol to yield 39.7 g of N-methyl-phenolphthalimidine. The filtrate was placed in the refrigerator and afforded an additional 27.6 g of the phthalimidine to give a total yield of 67.3 g.

(b) Diborane (200 ml) as a solution of 1M in BH$_3$ in tetrahydrofuran and 300 ml of dry tetrahydrofuran were charged into a three neck flask equipped with thermometer, condenser, dropping funnel and overhead stirred under an atmosphere of nitrogen. The flask was cooled in an ice bath to 0°–5° C., and 16.6 g of the compound of step (a) in 100 ml dry tetrahydrofuran was added dropwise, the temperature being maintained between 0° and 5° C. The reaction mixture became cloudy and then a white precipitate was observed. After addition was complete the flask was allowed to warm to room temperature and then heated to reflux for 24 hours. The white precipitate gradually dissolved, but a small amount of gummy material remained after 24 hours. The reaction mixture was cooled in an ice bath, carefully treated with 120 ml of 6N HCl and stirred until a clear lightly pink solution resulted. The solvent was removed under vacuum leaving a pink solid. The solid was heated to boiling in 150 ml water and 8.3 ml conc. HCl (color faded to white solid) and allowed to stand in refrigerator over the weekend. The white solid was suspended in 100 ml water and 200 ml ether and treated with 12.6 g of sodium bicarbonate. The solid dissolved in the ether layer. The ether layer was separated and the aqueous layer re-extracted with 100 ml of ether. The combined ether extracts were dried over sodium sulfate, the solvent removed leaving a tacky solid which was crystallized from benzene to give 13.17 g of N-methyl-bis-(4'-hydroxy-1'-phenyl)-iso-indoline, (melting range 186°–8° C.).

(c) β-(methylsulfonyl)ethylchloroformate (196 mg) in 8 ml of toluene was added dropwise over 20 minutes to a refluxing solution of 317.3 mg of the compound prepared in step (b) in 15 ml toluene. The yellow mixture was allowed to stir under reflux for an additional hour after addition was complete. The reaction mixture was a deep yellow. TLC on a sample using silica gel and 10% methanol/chloroform showed 3 major components and 2 minor components. The yellow spot representing the title compound when treated with 1N NaOH produced a magenta color which bleached in approximately 5 seconds. The solvent was removed from the remaining reaction mixture under vacuum to give a yellow solid. Preparative TLC with 150 mg of solid in 4 ml tetrahydrofuran using 10 % methanol/chloroform gave a yellow band which was separated and washed with acetone to yield approximately 5 mg of the title compound.

As noted previously, the compounds of the present invention are useful in photographic products and processes, e.g., as light-screening dyes, for example, antihalation or color correction filter dyes and may be employed in a conventional manner in the appropriate layer or layers of a photosensitive film unit. The use of the subject compounds in photographic products and processes is disclosed and claimed in copending U.S. Patent Application Ser. No. (Case 5837) of James W. Foley filed concurrently herewith. For convenience, the specification of this application is specifically incorporated herein.

As discussed above and also in the aforementioned application, the subject compounds have the ability to decolorize completely and irreversibly in base by undergoing an irreversible cleavage reaction after a predetermined time at a predetermined pH to give a new colorless compound which remains colorless at the pH's normally encountered during processing subsequent to bleaching so that the new compound may be retained in a photographic film unit, e.g., a photosensitive element without the possibility of color reappearing in time. In this regard, a sample of the compound prepared in the above Example was completely bleached within 5 seconds when treated with aqueous 1N NaOH and remained colorless after acidifying and again treating with aqueous 1N NaOH.

In addition to their utility as photographic light-screening dyes, the subject compounds may be used as a means for detecting the presence of alkali and also may be used in a validation or verification system, e.g., for documents by using their ability to decolorize within a predetermined time at a predetermined alkaline pH. For the latter and other related uses, the subject dyes may be employed to provide a particular pattern or symbol by treating a layer of the dye with an aqueous alkaline solution applied in an imagewise fashion to give the desired pattern or configuration.

Since certain changes may be made in the above product without departing from the scope of the invention herein involved, it is intended that all matter contained in the above description shall be interpreted as illustrative and not in a limiting sense.

What is claimed is:

1. A compound of the formula

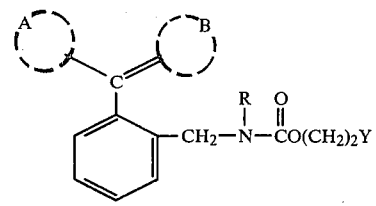

wherein A is a phenyl moiety or a naphthyl moiety; B is a 4'-oxo-1'-phenylidene moiety or a 4'-oxo-1'-naphthylidene moiety; R is alkyl, unsubstituted or substituted with a solubilizing group, and Y is an electron-withdrawing group.

2. A compound as defined in claim 1 wherein said A is a phenyl moiety.

3. A compound as defined in claim 2 wherein said B is a 4'-oxo-1'-phenylidene moiety.

4. A compound as defined in claim 1 wherein said R is alkyl.

5. A compound of the formula

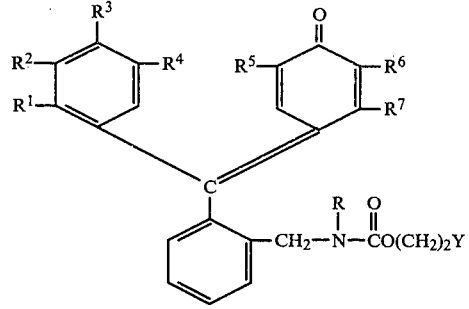

wherein $R^1$ is hydrogen, alkyl, alkoxy or hydroxy, $R^2$ and $R^4$ each are selected from hydrogen, alkyl, alkoxy, chloro and fluoro; $R^1$ and $R^2$ taken together represent the carbon atoms necessary to complete a fused benzene ring; $R^3$ is hydrogen, alkyl, alkoxy, hydroxy, —N,N—(dialkyl)amino, —N,N—(w—$R^8$alkyl)$_2$amino wherein $R^8$ is halo or hydroxy, piperidino, pyrrolidino, N-methylpiperazino, morpholino, thiomorpholino or tetrahydro-2H,4H-1,3,6-dioxazocino; $R^5$ is hydrogen, phenyl, alkyl, alkoxy, chloro or fluoro; $R^6$ is hydrogen, alkyl, alkoxy, chloro or fluoro; $R^7$ is hydrogen, alkyl, alkoxy or hydroxy and $R^6$ and $R^7$ taken together represent the carbon atoms necessary to complete a fused benzene ring; R is alkyl, unsubstituted or substituted with a solubilizing group; and Y is an electron-withdrawing group.

6. A compound as defined in claim 5 wherein said $R^3$ is hydroxy.

7. A compound as defined in claim 5 wherein said R is alkyl.

8. A compound as defined in claim 5 wherein said Y is an electron-withdrawing group having a positive sigma value greater than 0.6 as defined by Hammett's Equation.

9. The compound

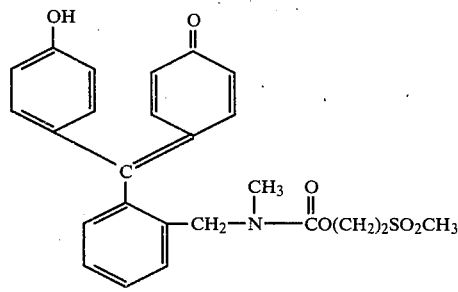

* * * * *